US009251728B2

(12) United States Patent
Kim et al.

(10) Patent No.: US 9,251,728 B2
(45) Date of Patent: Feb. 2, 2016

(54) METHOD OF DRIVING A 3D DISPLAY PANEL WITH ENHANCED LEFT-EYE IMAGE AND RIGHT-EYE IMAGE LUMINANCE DIFFERENCE AND DISPLAY APPARATUS FOR PERFORMING THE METHOD

(75) Inventors: Ah-Reum Kim, Seoul (KR); Jun-Pyo Lee, Asan-si (KR); Ik-Huyn Ahn, Asan-si (KR); Kang-Min Kim, Seoul (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 139 days.

(21) Appl. No.: 13/241,876

(22) Filed: Sep. 23, 2011

(65) Prior Publication Data

US 2012/0120058 A1    May 17, 2012

(30) Foreign Application Priority Data

Nov. 17, 2010    (KR) ........................ 10-2010-0114273

(51) Int. Cl.
*G09G 5/02*    (2006.01)
*G09G 3/00*    (2006.01)
(Continued)

(52) U.S. Cl.
CPC .............. *G09G 3/003* (2013.01); *G09G 3/3659* (2013.01); *H04N 13/0285* (2013.01); *H04N 13/0438* (2013.01); *G09G 3/3614* (2013.01); *G09G 2300/0443* (2013.01); *G09G 2300/0842* (2013.01); *G09G 2300/0852* (2013.01); *G09G 2320/0233* (2013.01);
(Continued)

(58) Field of Classification Search
CPC .................... G09G 3/3614; G09G 2310/0254; G09G 2320/0209; G09G 3/36; G09G 3/364; G09G 3/2074

USPC ................................ 345/212, 54, 79, 96, 209
See application file for complete search history.

(56) References Cited

U.S. PATENT DOCUMENTS

| 4,792,850 | A  | 12/1988 | Liptoh et al. |
| 9,001,195 | B2 | 4/2015  | Nakahata |

(Continued)

FOREIGN PATENT DOCUMENTS

| CN | 101420519 | 4/2009 |
| JP | 07-075135 | 3/1995 |

(Continued)

OTHER PUBLICATIONS

European Search Report Dated Jul. 20, 2012.
(Continued)

*Primary Examiner* — Jimmy H. Nguyen
*Assistant Examiner* — Hang Lin
(74) *Attorney, Agent, or Firm* — F. Chau & Associates, LLC

(57) ABSTRACT

In a method of driving a display panel, a first data voltage having a first potential difference with respect to a reference voltage is outputted to pixel units of the display panel during a first frame which the data voltage has a same polarity with respect to the reference voltage as a data voltage of a following frame, and a second data voltage having a second potential difference less than the first potential difference is output to pixel units of the display panel during a second frame in which the data voltage has a polarity with respect to the reference voltage that is reversed with respect to a data voltage of a following frame.

11 Claims, 10 Drawing Sheets

(51) Int. Cl.
*H04N 13/02* (2006.01)
*H04N 13/04* (2006.01)
*G09G 3/36* (2006.01)

(52) U.S. Cl.
CPC ............ *G09G 2320/0252* (2013.01); *G09G 2320/0285* (2013.01); *G09G 2330/023* (2013.01); *G09G 2340/16* (2013.01)

(56) References Cited

U.S. PATENT DOCUMENTS

| | | |
|---|---|---|
| 2007/0285366 A1* | 12/2007 | Ha et al. ............................ 345/87 |
| 2009/0027581 A1 | 1/2009 | You et al. |
| 2009/0040402 A1 | 2/2009 | Tomita et al. |
| 2009/0146914 A1 | 6/2009 | Seong et al. |
| 2009/0295703 A1* | 12/2009 | Hsieh et al. ..................... 345/94 |
| 2010/0007639 A1 | 1/2010 | Jeong et al. |
| 2010/0033470 A1* | 2/2010 | Lee et al. ....................... 345/212 |
| 2010/0231564 A1 | 9/2010 | Min et al. |
| 2010/0309381 A1* | 12/2010 | Nakagawa et al. ............ 348/705 |
| 2011/0074938 A1* | 3/2011 | Nakahata ........................ 348/56 |
| 2011/0304658 A1* | 12/2011 | Park et al. ..................... 345/691 |

FOREIGN PATENT DOCUMENTS

| | | |
|---|---|---|
| JP | 2840012 | 10/1998 |
| JP | 2008-268421 | 11/2008 |
| JP | 2009-075392 | 4/2009 |
| JP | 4376764 | 9/2009 |
| JP | 201175746 | 4/2011 |
| TW | 2007-08068 | 2/2007 |
| TW | 200949400 | 12/2009 |
| WO | WO 2010-058954 | 5/2010 |

OTHER PUBLICATIONS

English Abstract for Publication No. 07-075135 (for JP 2840012).
English Abstract for Publication No. 2009-075392.
English Abstract for Publication No. 2006-157775 (for JP 4376764).
European Office Action Dated Jun. 2, 2014.
Japanese Office Action dated Oct. 29, 2015.

* cited by examiner

METHOD OF DRIVING A 3D DISPLAY PANEL WITH ENHANCED LEFT-EYE IMAGE AND RIGHT-EYE IMAGE LUMINANCE DIFFERENCE AND DISPLAY APPARATUS FOR PERFORMING THE METHOD

CROSS REFERENCE TO RELATED APPLICATIONS

This application claims priority under 35 U.S.C. §119 to Korean Patent Application No. 2010-114273, filed on Nov. 17, 2010 in the Korean Intellectual Property Office (KIPO), the contents of which are herein incorporated by reference in their entireties.

BACKGROUND

1. Technical Field

Example embodiments of the present invention are directed to a method of driving display panel and a display apparatus for performing the method. More particularly, example embodiments of the present invention are directed to a method of driving a display panel that enhances display quality of a three-dimensional (3D) stereoscopic image and a display apparatus for performing the method.

2. Description of the Related Art

In general, a liquid crystal display (LCD) apparatus displays a two-dimensional (2D) image. Recently, display apparatuses capable of displaying a three-dimensional (3D) stereoscopic image have been developed, in response to consumer demand for 3D stereoscopic images in games, movies, etc.

In general, a display apparatus displays a 3D stereoscopic image using the binocular parallax of two human eyes. For example, since two human eyes are spaced apart from each other, images viewed at different angles are received by the brain and processed therein. Thus, a brain may perceive a single stereoscopic image.

A stereoscopic image display apparatus may be classified as either a stereoscopic type with an extra spectacle, or an auto-stereoscopic type without the extra spectacle. A stereoscopic type of display may be further classified as an anaglyph type or a liquid crystal shutter stereoscopic type. For the anaglyph type, a viewer wears a pair of glasses having blue and red lenses respectively for each eye. For the liquid crystal shutter stereoscopic type, a left-eye image and a right-eye image are alternately displayed, and the viewer wears a pair of glasses which sequentially open or close a left-eye or right-eye liquid crystal shutter that are respectively synchronized with the periods of the left and right-eye images.

In general, an inversion method is used to enhance after-image characteristics in a display apparatus. The inversion method may be classified into either a dot inversion method or a frame inversion method. In a shutter stereoscopic type using a frame inversion method, the left-eye and right-eye images are driven using time-division multiplexing, and thus a polarity of the data voltage changes. Thus, a luminance difference may occur between the left-eye image and the right-eye image.

SUMMARY

Example embodiments of the present invention provide a method of driving a display panel capable of enhancing a luminance difference between a left-eye image and a right-eye image.

Example embodiments of the present invention also provide a display apparatus for performing an above-mentioned method.

In an example method of driving a display panel according to an embodiment of the present invention, a first data voltage having a first potential with respect to a reference voltage is outputted to a pixel unit of the display panel during a first frame in which a data voltage has a polarity with respect to the reference voltage substantially identical to that of a data voltage in a following frame. A second data voltage having a second potential with respect to the reference voltage less than the first potential, is outputted to the pixel unit of the display panel during a second frame in which the data voltage polarity with respect to the reference voltage is reversed with respect to that of the data voltage in the following frame.

In another example method of driving a display panel according to an embodiment of the present invention, a plurality of left-eye data frames and a plurality of right-eye data frames are generated. An inversion signal having first frames and second frames is generated. The number of the first frames is equal to the number of the second frames. Based on the inversion signal, the left-eye and right-eye data frames are converted to data voltages having a polarity with respect to a reference data substantially identical to that of a data voltage of a previous frame during the first frames, and having a polarity with respect to the reference data voltage reversed with respect to that of the data voltage of the previous frame during the second frames. The data voltages are outputted to the display panel.

In still another example display apparatus according to an embodiment of the present invention, the display apparatus includes a display panel and a panel driving part. The display panel includes a plurality of pixel units. The panel driving part outputs a first data voltage to each of the pixel units during a first frame and a second data voltage to each of the pixel units during a second frame. During the first frames, the first data voltage has a first potential with respect to a reference voltage, and a polarity with respect to the reference voltage substantially identical to that a data voltage in a following frame. During the second frames. the second data voltage has a second potential with respect to the reference voltage less than the first potential, and a polarity with respect to the reference voltage that is reversed with respect to that of the data voltage in the following frame.

In still another example display apparatus according to an embodiment of the present invention, the display apparatus includes a display panel, a data compensating part, a timing controller and a data driving part. The display panel includes a plurality of pixel units. The data compensating part generates a plurality of left-eye data frames and a plurality of right-eye data frames. The timing controller generates an inversion signal having first frames and second frames. The number of the first frames is equal to the number of the second frames. Based on the inversion signal, the data driving part converts the left-eye and right-eye data frames to data voltages having a polarity with respect to a reference data voltage that is substantially identical to that of a data voltage of a previous frame, during the first frames, and having a polarity with respect to a reference data voltage that is reversed with respect to that of the data voltage of the previous frame, during the second frames. The data driving part outputs the data voltages to the display panel.

According to embodiments of the present invention, left eye data and right eye data are compensated by sharing the voltage with a charge-down capacitor using polarity inversion of the data voltage, to enhance a luminance difference between the left eye image and the right eye image. In addition, the luminance difference between the left eye image and the right eye image may be decreased by converting the inversion signal.

BRIEF DESCRIPTION OF THE DRAWINGS

The above and other features and advantages of the present invention will become more apparent by describing in detailed example embodiments thereof with reference to the accompanying drawings, in which.

DETAILED DESCRIPTION OF EXAMPLE EMBODIMENTS

Hereinafter, example embodiments of the present invention will be explained in detail with reference to the accompanying drawings.

Figure 1:
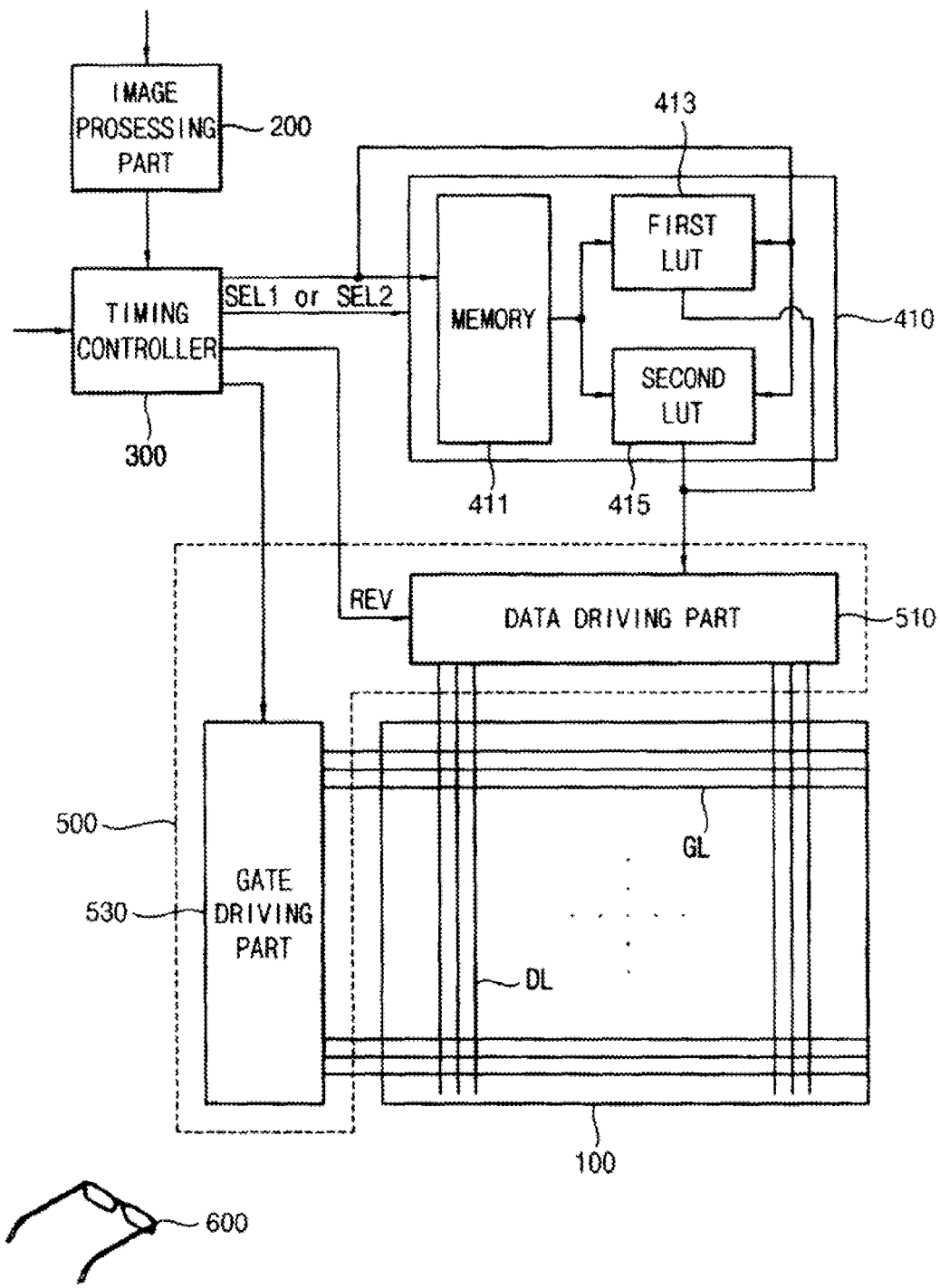
FIG. 1 is a block diagram of a display apparatus according to an example embodiment of the present invention.
Figure 2:
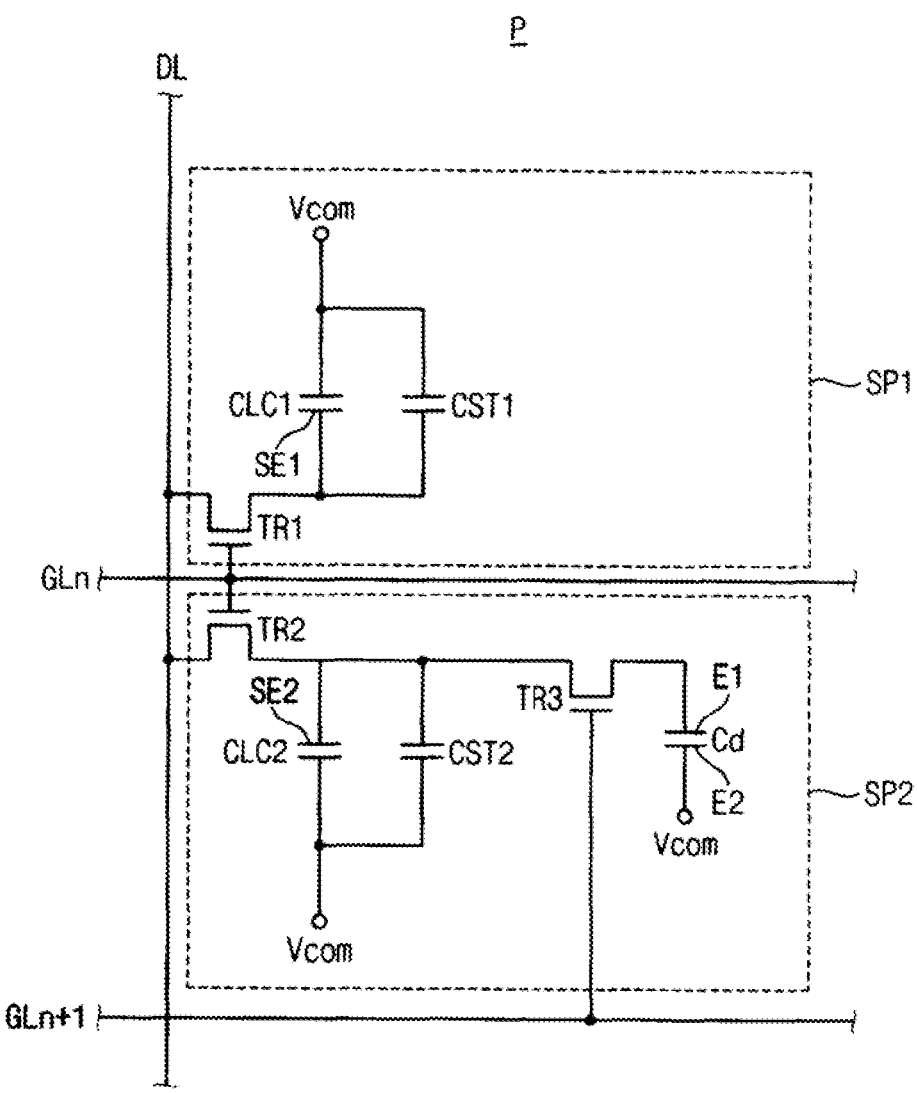
FIG. 2 is an equivalent circuit diagram of a display panel of FIG. 1.

FIG. 1 is a block diagram of a display apparatus according to an example embodiment of the present invention. FIG. 2 is an equivalent circuit diagram of a display panel of FIG. 1.

Referring to FIGS. 1 and 2, the display apparatus includes a display panel 100, an image processing part 200, a data compensating part 410, a timing controller 300, a panel driving part 500, and a shutter glass 600.

The display panel 100 includes a plurality of pixel regions defining a plurality of pixel units. Referring to FIG. 2, each pixel unit P includes a first switching element TR1, a first liquid crystal capacitor CLC1, a first storage capacitor CST1, a second switching element TR2, a second liquid crystal capacitor CLC2, a second storage capacitor CST2, a third switching element TR3 and a charge-down capacitor Cd. The pixel region of the pixel unit P includes a first sub region SP1 corresponding to a region in which the first liquid crystal capacitor CLC1 is formed, and a second sub region SP2 corresponding to a region in which the second liquid crystal capacitor CLC2 is formed.

The first switching element TR1 is connected to an N-th gate line GLn ('N' is a natural number), a data line DL and a first sub electrode SE1 of the first liquid crystal capacitor CLC1. The second switching element TR2 is connected to the N-th gate line GLn, the data line DL and a second sub electrode SE2 of the second liquid crystal capacitor CLC2. The third switching element TR3 is connected to an (N+1)-th gate line GLn+1, the second sub electrode SE2 of the second liquid crystal capacitor CLC2, and a first electrode E1 of the charge-down capacitor Cd.

In an N-th interval of a frame during which an N-th high level gate signal is received by the N-th gate line GLn, both the first switching element TR1 and the second switching element TR2 are turned on, after which a data voltage applied to the data line DL is applied to both the first and second sub electrodes SE1 and SE2. Then, in an (N+1)-th interval of the frame during which an (N+1)-th high level gate signal is received by the (N+1)-th gate line GLn+1, the third switching element TR3 is turned on, after which the data voltage applied to the second sub electrode SE2 is partially shared by the charge-down capacitor Cd. Accordingly, the data voltage is applied to the first liquid crystal capacitor CLC1, and a division voltage less than the data voltage is applied to the second liquid crystal capacitor CLC2. Accordingly, the first sub region SP1 of the pixel unit P is driven with a relatively high luminance, and the second sub region SP2 of the pixel unit P is driven with a relatively low luminance.

The image processing part 200 generates a plurality of data frames using the received data. For example, in a 240 Hz 3D stereoscopic image mode, the image processing part 200 divides the received data into left-eye data and right-eye data, generates the left-eye data frames and the right-eye data frames by respectively scaling the left-eye data and the right-eye data to a resolution of the display panel 100, and then repeatedly outputs the left-eye and right-eye data frames. In a 240 Hz 2D image mode, based on a data frame received during a present frame and a data frame received during a following frame, the image processing part 200 generates an interpolation data frame using motion estimation and interpolation. The image processing part 200 then generates a first data frame and a second data frame by repeating the data received during the present frame, and generates a first interpolation data frame and a second interpolation data frame by repeating the interpolation data frame.

The timing controller 300 provides the data compensating part 410 with a plurality of data frames received from the image processing part 200. In the 3D stereoscopic image mode, the timing controller 300 inserts a black left-eye data frame between the left-eye data frames and the right-eye data frame, and inserts a black right-eye data frame between the right-eye data frames and the left-eye data frames. In the 2D image mode, the timing controller 300 provides the data compensating part 410 with the plurality of data frames received from the image processing part 200 without further processing.

In addition, the timing controller 300 provides the data compensating part 410 and the panel driving part 500 with a control signal. The timing controller 300 provides the data compensating part 410 with a select signal SEL for selecting one of a first look-up table 413 and a second look-up table 415. In the 3D stereoscopic image mode, a first select signal SEL1 may include a high level and a low level, and in the 2D image mode, a second select signal SEL2 may include a high level and a low level. The timing controller 300 provides the panel driving part 500 with an inversion signal REV. The inversion signal REV reverses the polarity of the data voltage outputted from the data line with respect to a reference voltage.

The data compensating part 410 compensates data of the present frame using data of the previous frame to enhance a response speed of a liquid crystal, to decrease image distortion due to temperature. The above-mentioned compensation is referred to as dynamic capacitance compensation (DCC). For example, in DCC, grayscale data of the present frame are increased to a higher grayscale value to increase a rising response speed of the liquid crystal, when grayscale data of the present frame is much greater than grayscale data of the previous frame. However, in DCC, when the grayscale data of the present frame are much less than the grayscale data of the previous frame, the grayscale data of the present frame is decreased to a lower grayscale value to increase a falling response speed of the liquid crystal.

According to the present example embodiment, the data compensating part 410 includes a memory 411, a first look-up table 413 and a second look-up table 415. The memory 411 stores data. Data received during the present frame and first compensating data mapped into the previous frame are stored in the first look-up table 413. Data received during the present frame and second compensating data mapped into the previous frame are stored in the second look-up table 415. The data compensation part 410 selects one of the first or second look-up tables 413, 415, based on the level of a select signal received from the timing controller 300.

For example, in the 3D stereoscopic image mode, the data compensating part 410 generates the first compensating data using the first look-up table 413 upon receipt of a high level of the first select signal SEL1, and generates the second compensating data using the second look-up table 415 upon receipt of a low level of the first select signal SEL1. On the other hand, in the 2D image mode, the data compensating part 410 generates the first compensating data using the first look-up table 413 upon receipt of a high level of a second select signal SEL2.

In the 3D stereoscopic image mode, the second compensating data stored in the second look-up table are used to enhance the luminance difference between a left-eye image and a right-eye image. The second compensating data is described below in detail.

The panel driving part 500 includes a data driving part 510 and a gate driving part 530. The data driving part 510 outputs a data voltage to data lines of the display panel 100. The gate driving part 530 outputs a gate signal to gate lines of the display panel 100. The data driving part 510 generates data voltages having a positive polarity and a negative polarity with respect to a reference voltage Vcom of the compensating data provided to the data compensating part 410, based on the inversion signal REV received from the timing controller 300.

For example, the timing controller 300 provides the data driving part 510 with the inversion signal REV repeating a high level for four frames and a low level for four frames, and the data driving part 510 outputs a data voltage that reverses polarity every four frames in response to the inversion signal REV.

The shutter glass 600 is used in the 3D stereoscopic image mode. The shutter glass 600 includes a left-eye liquid crystal shutter which is open in an interval during which the left-eye image is displayed on the display panel and is closed in an interval during which the right-eye image is displayed on the display panel, and a right eye liquid crystal shutter which is open in an interval during which the right-eye image is displayed on the display panel and is closed in an interval during which the left-eye image is displayed on the display panel. In general, the shutter glass 600 may be driven at 60 Hz.

Figure 3:
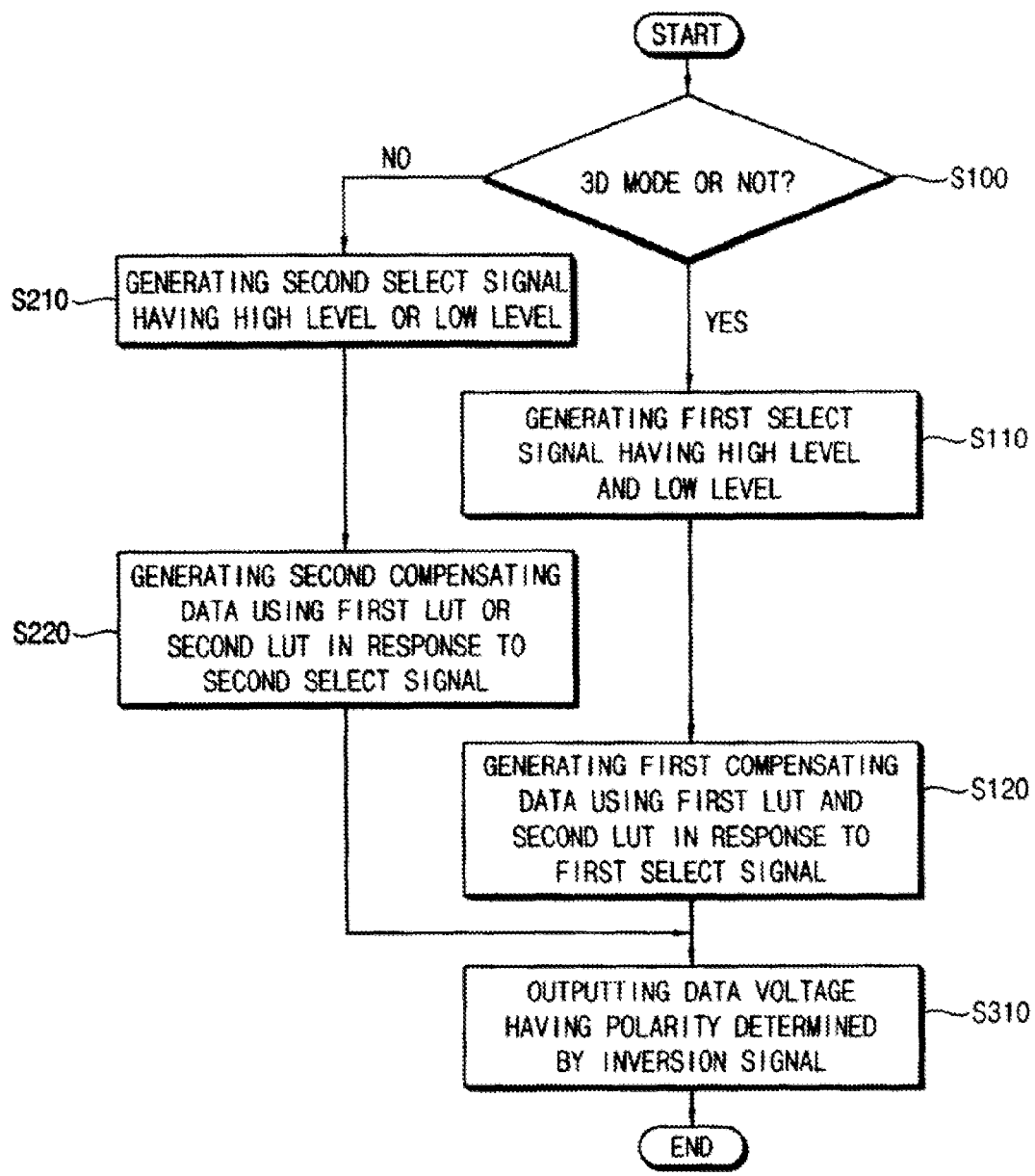
FIG. 3 is a flow chart illustrating a method of processing data in the display apparatus of FIG. 1.
Figure 4:
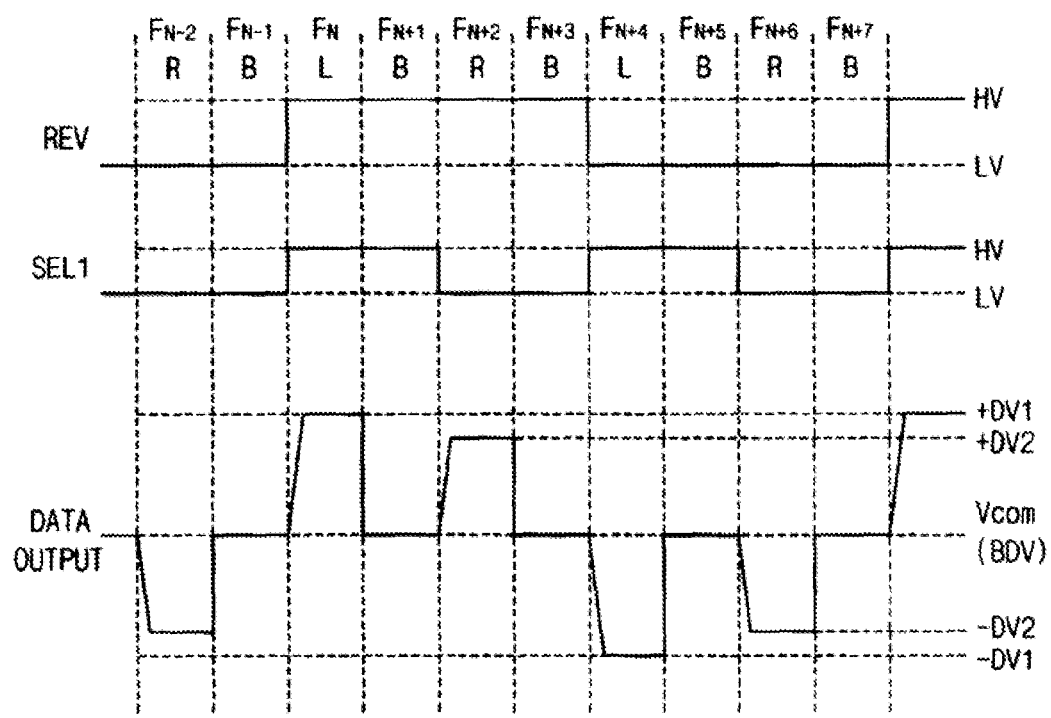
FIG. 4 is a timing diagram of input/output signals in a three-dimensional (3D) stereoscopic image mode in the method of processing data of FIG. 3.
Figure 5:
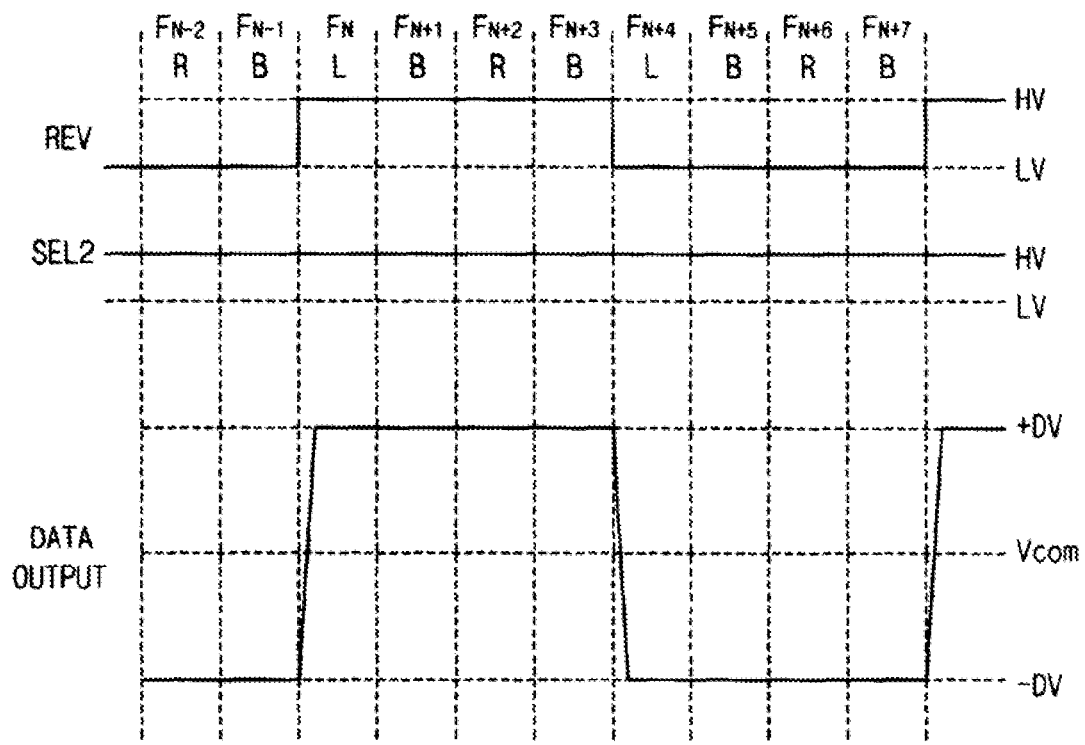
FIG. 5 is a timing diagram of input/output signals in a two-dimensional (2D) image mode in the method of processing data of FIG. 3.

FIG. 3 is a flow chart illustrating a method of processing data in the display apparatus of FIG. 1. FIG. 4 is a timing diagram of input/output signals in a 3D stereoscopic image mode in the method of processing data of FIG. 3. FIG. 5 is a timing diagram of input/output signals in a 2D image mode in the method of processing data of FIG. 3.

Referring to FIGS. 1, 3 and 4, it is first determined whether the display apparatus is displaying in 3D stereoscopic image mode or 2D image mode (STEP S100). If the display apparatus is displaying in 3D stereoscopic image mode, the image processing part 200 repeats a sequential output of a left-eye data frame L, a left-eye black data frame B, a right-eye data frame R, and a right-eye black data frame B.

The timing controller 300 generates a first select signal SEL1 and uses it to control the data compensating part 410 (STEP S110). The first select signal SEL1 is at a high level HV during an N-th frame and an (N+1)-th frame ($F_N$, $F_{N+1}$), a low level LV during an (N+2)-th frame and an (N+3)-th frame ($F_{N+2}$, $F_{N+3}$), the high level HV during an (N+4)-th frame and an (N+5)-th frame ($F_{N+4}$, $F_{N+5}$), and the low level LV during an (N+6)-th frame and an (N+7)-th frame ($F_{N+6}$, $F_{N+7}$). The first select signal SEL1 has a period of four frames comprising two frames at the high level HV and two frames at the low level LV.

The data compensating part 410 repeatedly receives in sequence the left-eye data frame, the left-eye black data frame, the right-eye data frame and the right-eye black data frame.

The left-eye data of the left-eye data frame are received during the N-th frame $F_N$, after which the data compensating part 410 generates left-eye first compensating data using the first look-up table 413 in response to the high level HV of the first select signal SEL1 (STEP S120). The left-eye first compensating data are mapped into the corresponding right-eye black data and left-eye data of the first look-up table 413. The right-eye black data were stored in the memory 411 during the previous, (N−1)-th frame $F_{N-1}$, and the left-eye data are received during the present, N-th frame $F_N$.

The left-eye black data of the left-eye black data frame are received during the (N+1)-th frame $F_{N+1}$, after which the data compensating part 410 generates left-eye first black data using the first look-up table 413 in response to the high level HV of the first select signal SELL (STEP S120). The left-eye first black data are mapped into the corresponding left-eye data and left-eye black data of the first look-up table 413. The left-eye data were stored in the memory 411 during the previous, N-th frame $F_N$, and the left-eye black data are received during the present, (N+1)-th frame $F_{N+1}$.

The right-eye data of the right-eye data frame are received during the (N+2)-th frame $F_{N+2}$, after which the data compensating part 410 generates right-eye second compensating data using the second look-up table 415 in response to the low level LV of the first select signal SEL1 (STEP S120). The second compensating data are mapped into the corresponding left-eye black data and the right-eye data of the second look-up table 415. The left-eye black data were stored in the memory 411 during the previous, (N+1)-th frame $F_{N+1}$, and the right-eye data are received during the present, (N+2)-th frame $F_{N+2}$.

The right-eye black data included in the right-eye black data frame are received during the (N+3)-th frame $F_{N+3}$, after which the data compensating part 410 generates right-eye second black data using the second look-up table 415 in response to the low level LV of the first select signal SELL (STEP S120). The right-eye second black data are mapped into the corresponding right-eye data and the right-eye black data of the second look-up table 415. The right-eye data were stored in the memory 411 during the previous, (N+2)-th frame $F_{N+3}$, and the right-eye black data are received during the present, (N+3)-th frame $F_{N+3}$.

In the same manner, the data compensating part 410 generates the left-eye first compensating data, the left-eye first black data, the right-eye second compensating data and the right-eye second black data during an (N+4)-th frame, an (N+5)-th frame, an (N+6)-th frame and an (N+7)-th frame ($F_{N+4}$, $F_{N+5}$, $F_{N+6}$, $F_{N+7}$). The data compensating part 410 uses the second look-up table 415 to generate the right-eye second compensating data having a grayscale value that is less than the left-eye first compensating data. According to the inversion method described below, the left-eye image luminance corresponding to the left-eye first compensating data becomes substantially uniform with the right-eye image luminance corresponding to the right-eye second compensating data.

The timing controller 300 provides the data driving part 510 with the inversion signal REV to control a polarity of an output signal of the data driving part 510. The inversion signal REV is at the high level HV during the N-th frame, the (N+1)-th frame, the (N+2)-th frame and the (N+3)-th frame ($F_N$, $F_{N+1}$, $F_{N+2}$, $F_{N+3}$), and is at the low level LV during the (N+4)-th frame, the (N+5)-th frame, the (N+6)-th frame and the (N+7)-th frame ($F_{N+4}$, $F_{N+5}$, $F_{N+6}$, $F_{N+7}$). The inversion signal REV has a period of eight frames.

The data driving part 510 outputs a data voltage having a positive polarity with respect to the reference voltage Vcom during the N-th frame, the (N+1)-th frame, the (N+2)-th frame and the (N+3)-th frame ($F_N$, $F_{N+1}$, $F_{N+2}$, $F_{N+3}$), based on the high level HV of the inversion signal REV (STEP S310). For example, the data driving part 510 converts the left-eye first compensating data to a positive polarity first data voltage +DV1, and outputs the positive polarity first data voltage +DV1 during the N-th frame $F_N$. The data driving part 510 converts the left-eye first compensating black data to a black data voltage BDV, and outputs the black data voltage BDV during the (N+1)-th frame $F_{N+1}$. The data driving part 510 converts the right-eye second compensating data to a positive polarity second data voltage +DV2, and outputs the positive polarity second data voltage +DV2 during the (N+2)-th frame $f_{N+2}$. The data driving part 510 converts the right-eye second compensating black data to the black data voltage BDV, and then outputs the black data voltage BDV during the (N+3)-th frame $F_{N+3}$.

In the same manner, based on the low level LV of the inversion signal REV, the data driving part 510 outputs a first data voltage −DV1 having a negative polarity with respect to the reference voltage Vcom, the black data voltage BDV, a negative polarity second data voltage −DV2, and the black data voltage BDV during the (N+4)-th frame, the (N+5)-th frame, the (N+6)-th frame and the (N+7)-th frame ($F_{N+4}$, $F_{N+5}$, $F_{N+6}$, $F_{N+7}$) (STEP S310).

Referring to FIGS. 1, 3 and 5, if it is determined that the display apparatus is displaying in the 2D image mode (STEP S100), the timing controller 300 generates a high level second select signal SEL2 and provides it to the data compensating part 410 (STEP S210). The data compensating part 410 generates compensating data corresponding to the received data using the first look-up table 413, in response to the second select signal SEL2.

In the 2D image mode, the data compensating part 410 repeatedly receives in sequence a first data frame, a second data frame, a first interpolation data frame and a second interpolation data frame from the timing controller 300.

When data of the first data frame are received during the N-th frame $F_N$, the data compensating part 410 generates the first compensating data using the first look-up table 413 in response to the high level HV of the second select signal SEL2 (STEP S220). The first compensating data are mapped into corresponding data stored in the memory 411 during the previous, (N−1)-th frame $F_{N-1}$, and data received during the present, N-th frame $F_N$.

In the same manner, the data compensating part 410, in the 2D image mode, generates the first compensating data of the received data using the first look-up table 413 in response to a high level HV of the second select signal SEL2 (STEP S220).

The timing controller 300 provides the data driving part 510 with the inversion signal REV to control a polarity of an output signal from the data driving part 510. The inversion signal REV is at the high level HV during the N-th frame, the (N+1)-th frame, the (N+2)-th frame and the (N+3)-th frame ($F_N$, $f_{N+1}$, $F_{N+2}$, $F_{N+3}$), and is at the low level LV during the (N+4)-th frame, the (N+5)-th frame, the (N+6)-th frame and the (N+7)-th frame ($F_{N+4}$, $F_{N+5}$, $F_{N+6}$, $F_{N+7}$). The eight frame period inversion signal REV is described as a non-limiting example, and inversion signal periods of a different number of frames are within the scope of other example embodiments of the invention.

The data driving part 510 outputs a positive polarity data voltage with respect to the reference voltage Vcom in response to the high level HV of the inversion signal REV during the N-th frame, the (N+1)-th frame, the (N+2)-th frame and the (N+3)-th frame ($F_N$, $F_{N+1}$, $F_{N+2}$, $F_{N+3}$), and outputs a negative polarity data voltage with respect to the reference voltage Vcom in response to the low level LV of the inversion signal REV during the (N+4)-th frame, the (N+5)-th frame, the (N+6)-th frame and the (N+7)-th frame ($F_{N+4}$, $F_{N+5}$, $F_{N+6}$, $F_{N+7}$) (STEP S310). For example, the data driving part 510 converts the first compensating data to the positive polarity first data voltage +DV1, and outputs the positive polarity first data voltage +DV1 during the N-th frame, the (N+1)-th frame, the (N+2)-th frame and the (N+3)-th frame ($F_N$, $F_{N+1}$, $F_{N+2}$, $F_{N+3}$). The data driving part 510 converts the first compensating data to the negative polarity first data voltage −DV1, and outputs the negative polarity first data voltage −DV1 during the (N+4)-th frame, the (N+5)-th frame, the (N+6)-th frame and the (N+7)-th frame ($F_{N+4}$, $F_{N+5}$, $F_{N+6}$, $F_{N+7}$).

Figure 6A:
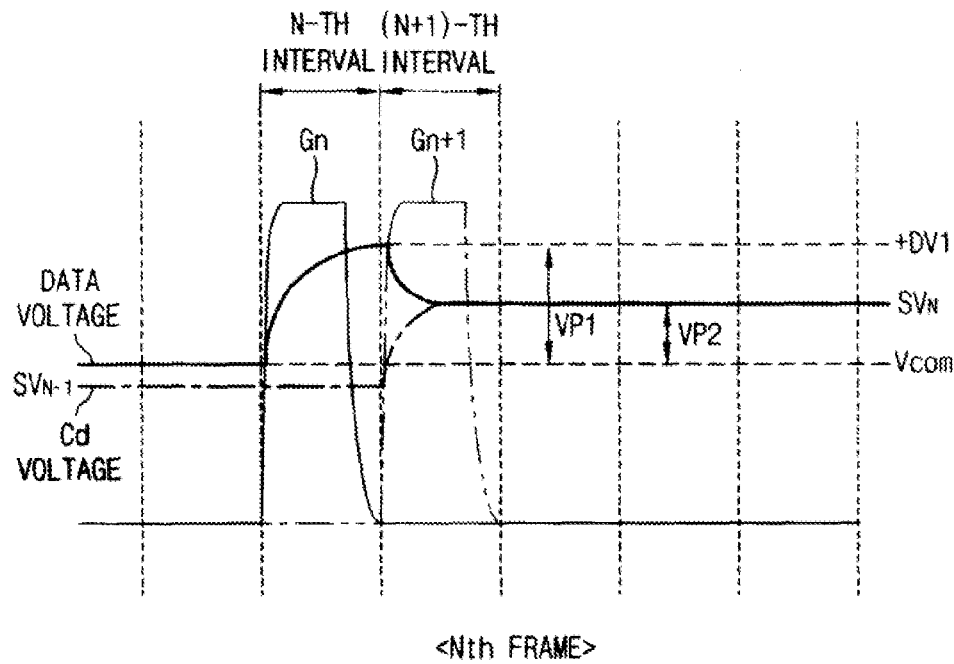
FIGS. 6A and 6B are waveform diagrams illustrating an operation of a pixel unit of FIG. 2 in the 3D stereoscopic image mode.
Figure 6B:
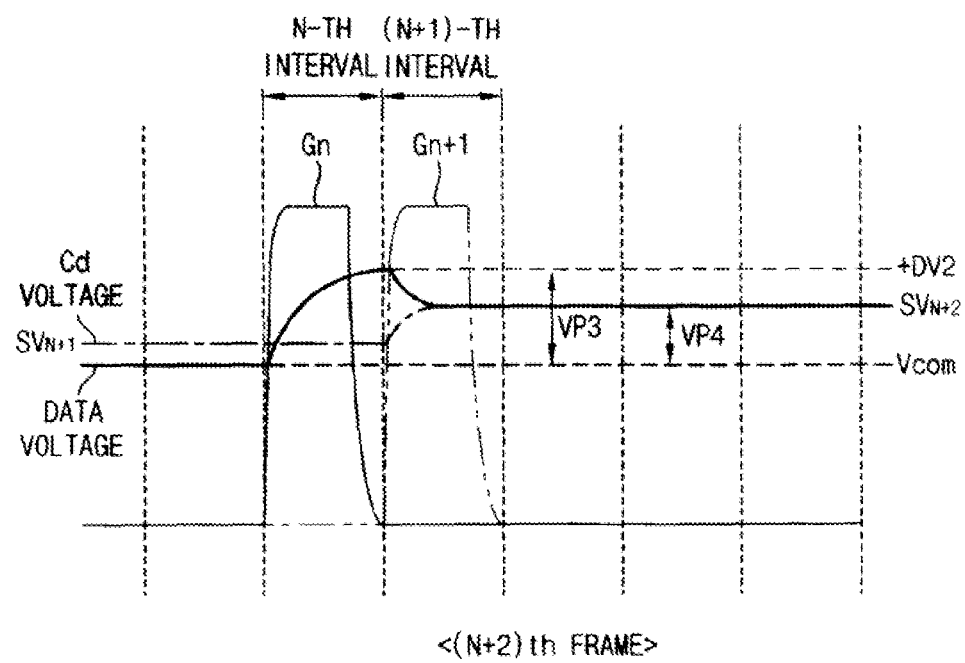

FIGS. 6A and 6B are waveform diagrams illustrating an operation of the pixel unit of FIG. 2 in the 3D stereoscopic image mode.

Referring to FIGS. 1, 2, 4, and 6A, the data lines DL receives a left-eye first data voltage, a left-eye first black data voltage, a right-eye second data voltage and a right-eye second black data voltage during four frames. The corresponding inversion signal REV has a period of eight frames. Accordingly, the left-eye first data voltage has a polarity substantially identical to that of the right-eye second data voltage in the following frame, and the right-eye second data voltage has a polarity reversed with respect to that of the left-eye first data voltage. For example, the left-eye first data voltage has a polarity reversed with respect to that of the right-eye second data voltage in the previous frame, and the right-eye second data voltage has the polarity substantially identical to that of the left-eye first data.

For example, the positive polarity first data voltage +DV1 is applied to the data lines DL during the N-th frame $F_N$. When the N-th gate signal is applied to the N-th gate line GLn, the left-eye first data voltage +DV1 is applied to both the first and second sub electrodes SE1 and SE2. The positive polarity first data voltage +DV1 corresponds to the first compensating data from the first look-up table 413, and has a first potential VP1 with respect to the reference voltage Vcom. Until the (N+1)-th gate signal is applied, the charge-down capacitor Cd maintains a negative polarity division voltage −$SV_{N-1}$ corresponding to a charge shared during the (N−1)-th frame $F_{N-1}$. The division voltage $-SV_{N-1}$ has a negative polarity based on the left-eye black data voltage of the (N−1)-th frame $F_{N-1}$ and a negative polarity right-eye data voltage of the (N−2)-th frame $F_{N-2}$.

Then, when the (N+1)-th gate signal Gn+1 is applied, the positive polarity first data voltage +DV1 applied to the second liquid crystal capacitor CLC2 is partially shared by the charge-down capacitor Cd. When the positive polarity first data voltage +DV1 is applied to the first electrode E1 to maintain the division voltage $-SV_{N-1}$ of the (N−1)-th frame in the second electrode E2, the charge-down capacitor Cd is charged to an amount corresponding to a difference between the positive polarity first data voltage +DV1 and the division voltage $-SV_{N-1}$. Therefore, a first division voltage $+SV_N$, which is the positive polarity first data voltage +DV1 except for the voltage shared by the charge-down capacitor Cd, is applied to the second liquid crystal capacitor CLC2. The first division voltage $+SV_N$ has a second potential VP2 less than the first potential VP1 with respect to the reference voltage Vcom.

As a result, the positive polarity first data voltage +DV1 is applied to the first sub electrode SE1, and the first division voltage $+SV_N$ is applied to the second sub electrode SE2. Accordingly, the transmittance of the first sub region SP1 is higher than the transmittance of the second sub region SP2.

Referring to FIGS. 1, 2, 4, and 6B, a right-eye positive polarity second data voltage +DV2 is applied to the data lines DL during the (N+2)-th frame $F_{N+2}$. When the N-th gate signal Gn is applied to the N-th gate line GLn, the positive polarity second data voltage +DV2 is applied to both the first and second sub electrodes SE1 and SE2. The positive polarity second data voltage +DV2, corresponding to the second compensating data of the second look-up table 415, has a third potential VP3 with respect to the reference voltage Vcom. Until the (N+1)-th gate signal is applied, the charge-down capacitor Cd maintains a positive polarity division voltage $+SV_{N+1}$ corresponding to a charge shared during the (N+1)-th frame $F_{N+1}$. The division voltage $+SV_{N+1}$ has a positive polarity based on the left-eye black data voltage of the (N+1)-th frame $F_{N-1}$ and the positive polarity left-eye data voltage of the N-th frame $F_N$.

Then, when the (N+1)-th gate signal Gn+1 is applied, the positive polarity second data voltage +DV2 applied to the second liquid crystal capacitor CLC2 is partially shared by the charge-down capacitor Cd. When the positive polarity second data voltage +DV2 is applied to the first electrode E1 to maintain the division voltage $+SV_{N+1}$ of the (N+1)-th frame in the second electrode E2, the charge-down capacitor Cd is charged to an amount corresponding to a difference between the positive polarity second data voltage +DV2 and the division voltage $+SV_{N+1}$. Therefore, a second division voltage $+SV_{N+2}$, which is the positive polarity second data voltage +DV2 except for a voltage shared by the charge-down capacitor Cd, is applied to the second liquid crystal capacitor CLC2. The second division voltage $+SV_{N+2}$ has a fourth potential VP4 less than the third potential VP3, with respect to the reference voltage Vcom.

As a result, the positive polarity second data voltage +DV2 is applied to the first sub electrode SE1, and the second division voltage $+SV_{N+2}$ is applied to the second sub electrode SE2. Accordingly, the transmittance of the first sub region SP1 is higher than the transmittance of the second sub region SP2.

Referring to FIGS. 1, 6A and 6B, pixel data of the pixel unit are compensated by the first compensating data from the first look-up table 413, and the first compensating data are converted to first data voltages and provided to the first liquid crystal capacitor CLC1 during the N-th frame $F_N$. In addition, the first data voltage +DV1 is divided into a first division voltage $+SV_N$ by the charge-down capacitor Cd, and provided to the second liquid crystal capacitor CLC2. Accordingly, a pixel electrode of the first liquid crystal capacitor CLC1 has the first potential VP1, and a pixel electrode of the second liquid crystal capacitor CLC2 has the second potential VP2 less than the first potential VP1. A first sub region SP1 of the pixel unit P in which the first liquid crystal capacitor CLC1 is formed has a first transmittance, a second sub region SP2 of the pixel unit P in which the second liquid crystal capacitor CLC2 is formed has a second transmittance less than the first transmittance, and the pixel unit P has a first average transmittance.

Pixel data of the pixel unit are compensated by a second compensating data from the second look-up table 415, and the second compensating data are converted to second data voltages +DV2 and provided to the first liquid crystal capacitor CLC1 during the (N+2)-th frame $F_{N+2}$. In addition, the second data voltage +DV2 is divided into the second division voltage $+SV_{N+2}$ by the charge-down capacitor Cd, and provided to the second liquid crystal capacitor CLC2. Accordingly, a pixel electrode of the first liquid crystal capacitor CLC1 has a third potential VP3 less than the first potential VP1, and a pixel electrode of the second liquid crystal capacitor CLC2 has a fourth potential VP4 less than the third potential VP3 and greater than the second potential VP2. The first sub region SP1 of the pixel unit P in which the first liquid crystal capacitor CLC1 is formed has a third transmittance less than the first transmittance, the second sub region SP2 of the pixel unit P in which the second liquid crystal capacitor CLC2 is formed has a fourth transmittance less than the third transmittance and greater than the second transmittance, and the pixel unit P has a second average transmittance substantially identical to the first average transmittance.

According to the present example embodiment, different look-up tables are respectively applied to the first frame and the second frame. In the first frame, the data voltage has a polarity substantially identical to that of the data voltage during the following frame, and in the second frame, the data voltage has a polarity reversed with respect to that of the data voltage during the following frame. Thus, a luminance difference between the frames may be removed.

Figure 7:
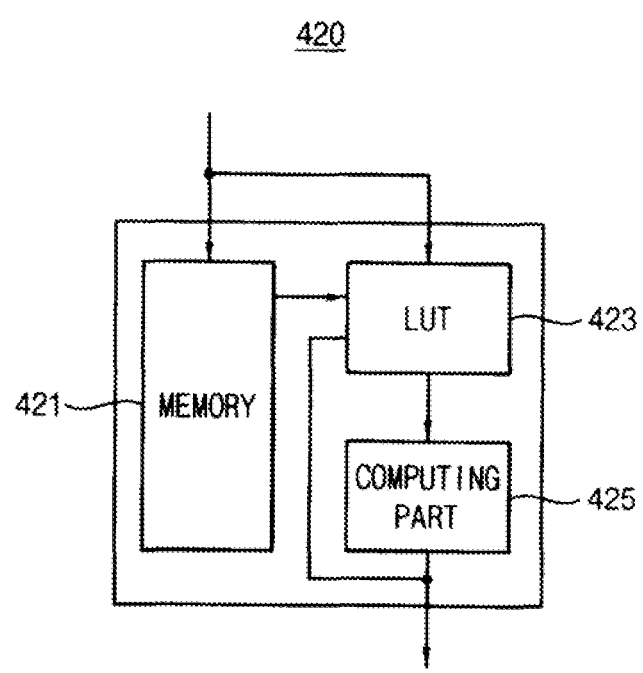
FIG. 7 is a block diagram of a data compensation part according to another example embodiment of the present invention.

FIG. 7 is a block diagram of a data compensation part according to another example embodiment of the present invention.

Referring to FIGS. 1 and 7, a display apparatus according to the present example embodiment has substantially same elements as those of the display apparatus in the previous example embodiment described in FIG. 1 except for a data compensating part. Hereinafter, the same reference numerals will be used to refer to the same or like parts as those described in the previous example embodiment in FIG. 1, and any further repetitive explanation concerning the above elements will be omitted.

The data compensating part 420 includes a memory 421, a look-up table 423, and a computing part 425. The memory 421 stores data. The data received during the present frame and the first compensating data of the previous frame are stored in the look-up table 423. The computing part 425 generates second compensating data corresponding to the data received using the first compensating data. The second compensating data can enhance the luminance difference between the left-eye image and the right-eye image in the 3D stereoscopic image mode, as explained in the previous example embodiment.

According to the present example embodiment, the look-up table and the computing part are applied to remove luminance differences between the frames. The first compensating data are stored in the look-up table, and are applied to one of the cases in which the voltage polarity in the present frame is substantially identical to the voltage polarity in the following frame, or in which the voltage polarity in the present frame is reversed with respect to the voltage polarity in the following frame. The computing part generates the second compensating data with respect to the other cases mentioned above using an algorithm predetermined by the first compensating data. The second compensating data are preset for the pixel unit to have a transmittance substantially identical to that of the first compensating data with respect to the same grayscale data.

Figure 8:
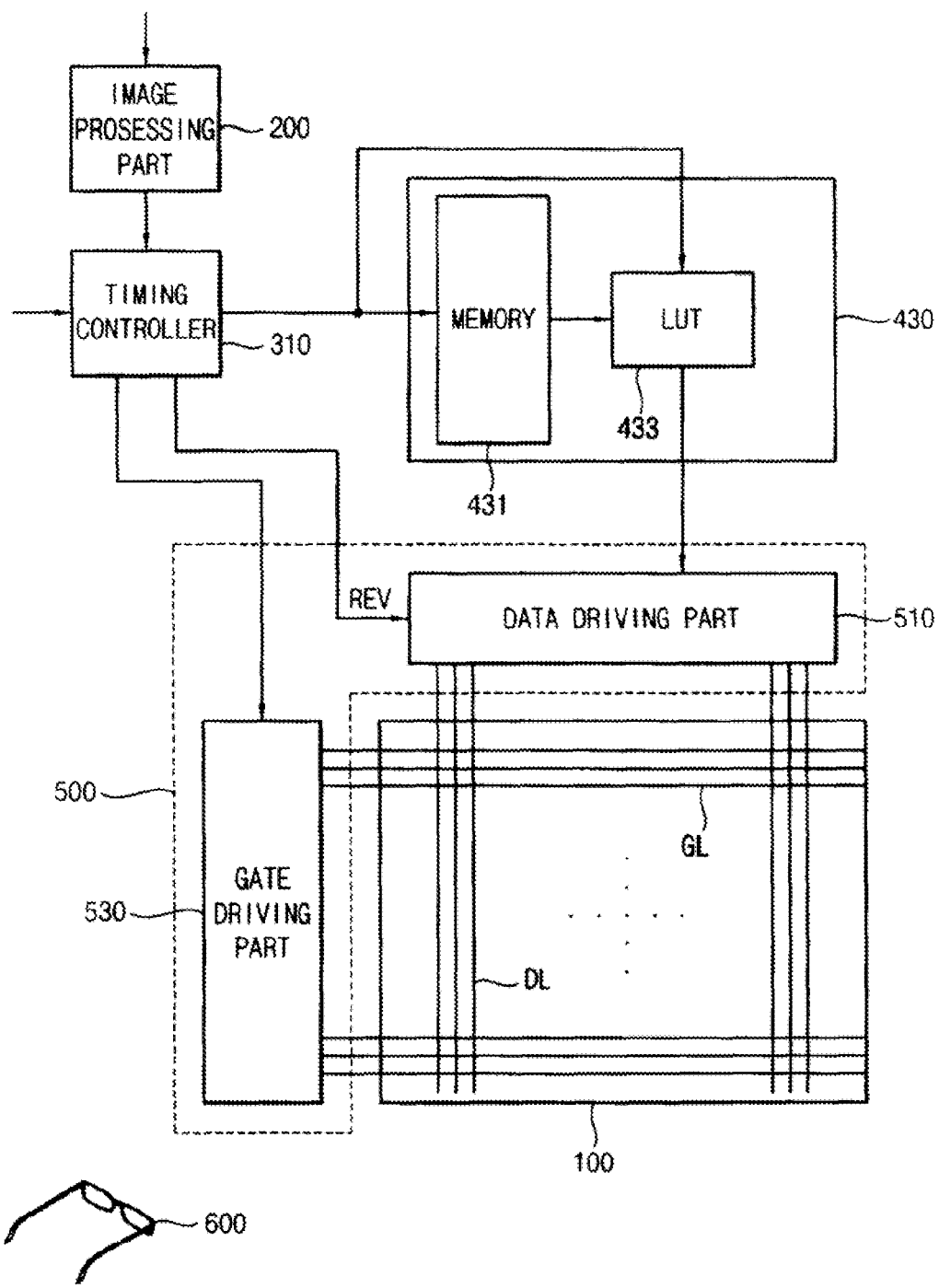
FIG. 8 is a block diagram of a display apparatus according to still another example embodiment of the present invention.

FIG. 8 is a block diagram of a display apparatus according to still another example embodiment of the present invention. Hereinafter, the same reference numerals will be used to refer to the same or like parts as those described in the previous example embodiment in FIG. 1 and any further repetitive explanation concerning the above elements will be omitted.

Referring to FIG. 8, the display apparatus includes a display panel 100, an image processing part 200, a timing controller 310, a data compensating part 430, a panel driving part 500 and a shutter glass 600.

As described in FIG. 2, the display panel 100 includes a plurality of pixel regions defining a plurality of pixel units. Referring to FIG. 2, each pixel unit P includes a first switching element TR1, a first liquid crystal capacitor CLC1, a first storage capacitor CST1, a second switching element TR2, a second liquid crystal capacitor CLC2, a second storage capacitor CST2, a third switching element TR3 and a charge-down capacitor Cd. The pixel region of the pixel unit P includes a first sub region SP1 corresponding to a region in which the first liquid crystal capacitor CLC1 is formed, and a second sub region SP2 corresponding to a region in which the second liquid crystal capacitor CLC2 is formed. A data voltage is applied to the first liquid crystal capacitor CLC1 and a division voltage smaller than the data voltage is applied to the second liquid crystal capacitor CLC2. Accordingly, the first sub region SP1 of the pixel unit P is driven with a relatively high luminance, and the second sub region SP2 is driven with a relatively low luminance.

The image processing part 200 generates a plurality of data frames using received data. For example, in a 240 Hz 3D stereoscopic image mode, the image processing part 200 generates and repeatedly outputs left-eye data frames and right-eye data frames. In a 240 Hz 2D image mode, the image processing part 200 repeats the data frame received in the present frame to generate the first data frame and the second data frame, and repeats the interpolation frames to generate first and second interpolation data frames.

The timing controller 310 provides the data compensating part 430 with a plurality of data frames received from the image processing part 200. In the 3D stereoscopic image mode, the timing controller 310 inserts a left-eye black data frame between the left-eye data frame and the right-eye data frame, and inserts a right-eye black data frame between the right-eye data frame and the left-eye data frame. In the 2D image mode, the timing controller 310 provides the data compensating part 430 with a plurality of data frames received from the image processing part 200 without further processing.

In addition, the timing controller 310 provides the panel driving part 500 with an inversion signal REV for enhancing a luminance difference between a left-eye image and a right-eye image. The inversion signal REV reverses a polarity of data voltage outputted through the data lines with respect to the reference voltage Vcom.

In the 3D stereoscopic image mode, the inversion signal REV has a period in which the number of first frames for the left-eye frames is equal to the number of second frames for the right-eye frames. A data voltage has a polarity with respect to a reference data voltage substantially identical to that of a previous frame during the first frames, and a polarity with respect to a reference data voltage reversed with respect to that of the previous frame during the second frames. For example, when the display panel is driven with a frame frequency of (60×I) Hz, the inversion signal REV has a low level during first I frames, a high level during second I frames, the low level during following two frames, the high level during third I frames, the low level during fourth I frames, and the high level during following two frames. A period includes [(4×I)×K+4]-frames. Here, 'K' and 'I' are natural numbers, and is greater than or equal to 4.

The inversion signal REV may be applied in the 2D image mode in substantially the same manner as in the previous example embodiment in FIG. 5. The inversion signal REV is described below in detail.

The data compensating part 430 includes a memory 431 and a look-up table 433. The memory 431 stores data. The data received during the present frame, and first compensating data from the previous frame are stored in the look-up table 433. Using the received data and the data stored in the memory 431, the data compensating part 430 outputs the compensating data stored in the look-up table 433 as compensating data of the received data.

The panel driving part 500 includes a data driving part 510 and a gate driving part 530. The data driving part 510 generates a data voltage corresponding to the compensating data received from the data compensating part 430 and having a positive polarity or a negative polarity with respect to a reference voltage Vcom, based on the inversion signal REV received from the timing controller 310.

The shutter glass 600 is used in the 3D stereoscopic image mode. The shutter glass 600 includes a left-eye liquid crystal shutter which is open during intervals in which a left-eye image is displayed on the display panel 100 and closed during intervals in which a right-eye image is displayed on the display panel 100, and a right-eye liquid crystal shutter which is open during intervals in which the right-eye image is displayed on the display panel 100 and closed during intervals in which the left-eye image is displayed on the display panel 100. In general, the shutter glass 600 may be driven at 60 Hz.

Figure 9A:
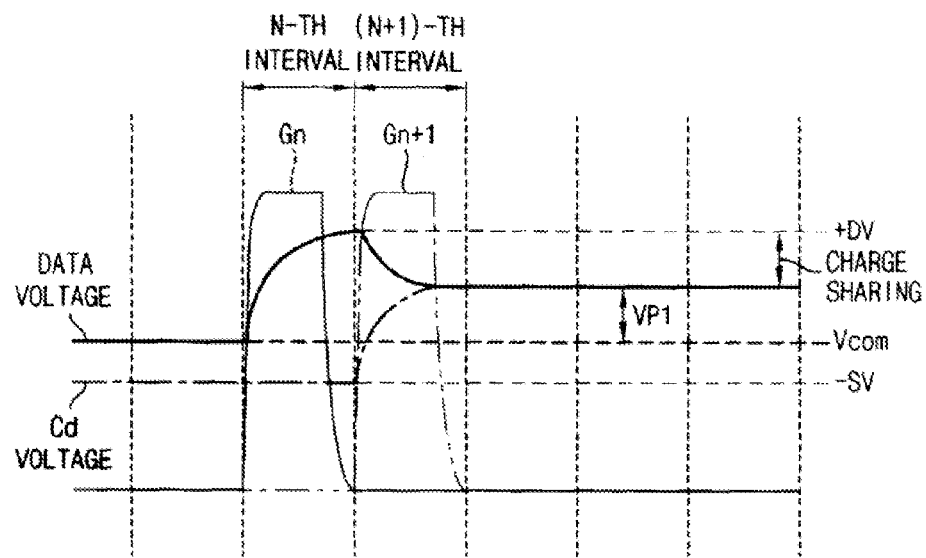
FIGS. 9A and 9B are waveform diagrams illustrating an operation of a pixel unit as a function of polarity transitions of the data voltage in the display apparatus of FIG. 8.
Figure 9B:
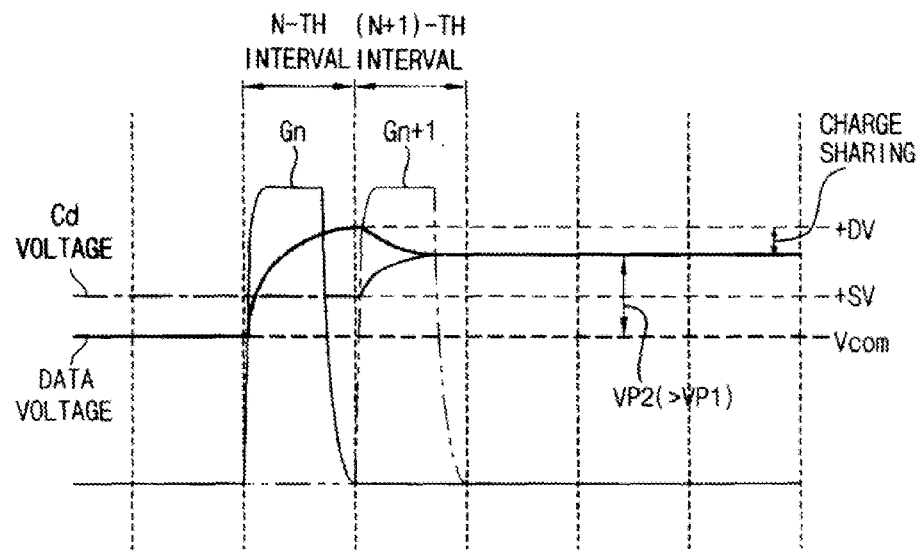

FIGS. 9A and 9B are waveform diagrams illustrating an operation of a pixel unit as a function of polarity transitions of the data voltage in the display apparatus of FIG. 8.

In FIG. 9A, a polarity of the data voltage applied during the present frame is substantially same as the polarity of the data voltage applied in the previous frame. Here, the data voltage applied to the data lines DL during the present frame has a positive (+) polarity, and the data voltage applied to the data lines DL in the previous frame has a negative (−) polarity.

Referring to FIG. 9A, a positive polarity data voltage +DV is applied to the data lines DL of the pixel unit P. When the N-th gate signal Gn is applied to the N-th gate line GLn, the data voltage +DV1 is applied to both the first and second sub electrodes SE1 and SE2. Until the (N+1)-th gate signal is applied, the charge-down capacitor Cd maintains a division voltage −SV corresponding to a shared charge in the previous frame. The division voltage −SV has a negative polarity based on the negative polarity data voltage in the previous frame.

Then, when the (N+1)-th gate signal Gn+1 is applied, the positive polarity data voltage +DV is applied to the first electrode E1 of the charge-down capacitor Cd. Since the positive polarity data voltage +DV is applied to the first electrode E1 to maintain the negative polarity division voltage −SV in the second electrode E2, the charge-down capacitor Cd is charged to an amount corresponding to the difference between the positive polarity data voltage +DV and the negative polarity division voltage −SV. The charge shared by the charge-down capacitor Cd is proportional to the difference between the positive polarity data voltage +DV and the negative polarity division voltage −SV. Accordingly, a potential VP1 of both electrodes of the second liquid crystal capacitor CLC2 is decreased, decreasing a transmittance and luminance of the second sub region SP2 of the pixel unit P relative to that of the first sub region SP1.

In FIG. 9B, a polarity of the data voltage applied during the present frame is substantially identical to that of the data voltage applied in the previous frame. Here, the data voltage applied to the data lines DL during the present frame has a positive (+) polarity, and the data voltage applied to the data lines DL in the previous frame has a positive (+) polarity.

Referring to FIG. 9B, a positive polarity data voltage +DV is applied to the data lines DL of the pixel unit P. When the N-th gate signal Gn is applied to the N-th gate line GLn, the data voltage +DV1 is applied to both the first and second sub electrodes SE1 and SE2. Until the (N+1)-th gate signal is applied, the charge-down capacitor Cd maintains a division voltage +SV corresponding to a charge shared in the previous frame. The division voltage +SV has a positive polarity based on the positive polarity data voltage in the previous frame.

Then, when the (N+1)-th gate signal Gn+1 is applied, the positive polarity data voltage +DV is applied to the first electrode E1 of the charge-down capacitor Cd. Since the positive polarity data voltage +DV is applied to the first electrode E1 to maintain the positive polarity division voltage +SV in the second electrode E2, the charge-down capacitor Cd is charged to an amount corresponding to the difference between the positive polarity data voltage +DV and the positive polarity division voltage +SV. The charge shared by the charge-down capacitor Cd is proportional to the difference between the positive polarity data voltage +DV and the positive polarity division voltage +SV. Accordingly, a potential VP2 of both electrodes of the second liquid crystal capacitor CLC2 is increased, increasing transmittance and luminance of the second sub region SP2 of the pixel unit P relative to that of the first sub region SP1.

Comparing FIG. 9A to FIG. 9B, when the polarity of the data voltage applied during the present frame is reversed with respect to that of the data voltage during the previous frame, the second sub region SP2 of the pixel unit P becomes darker. When the polarity of the data voltage applied during the present frame is substantially identical to that of the data voltage during the previous frame, the second sub region SP2 of the pixel unit P becomes brighter.

According to the above-mentioned characteristics in the 3D stereoscopic image mode, when the left-eye and right-eye images are displayed on the pixel unit P, left-eye and right-eye images of different luminance may be displayed at the same grayscale as the data voltage polarity changes.

Hereinafter, a frame inversion method according to a present example embodiment to remove the luminance difference between the left-eye and right eye images due to the changes of the data voltage polarity will be explained with reference to FIG. 10.

Figure 10:
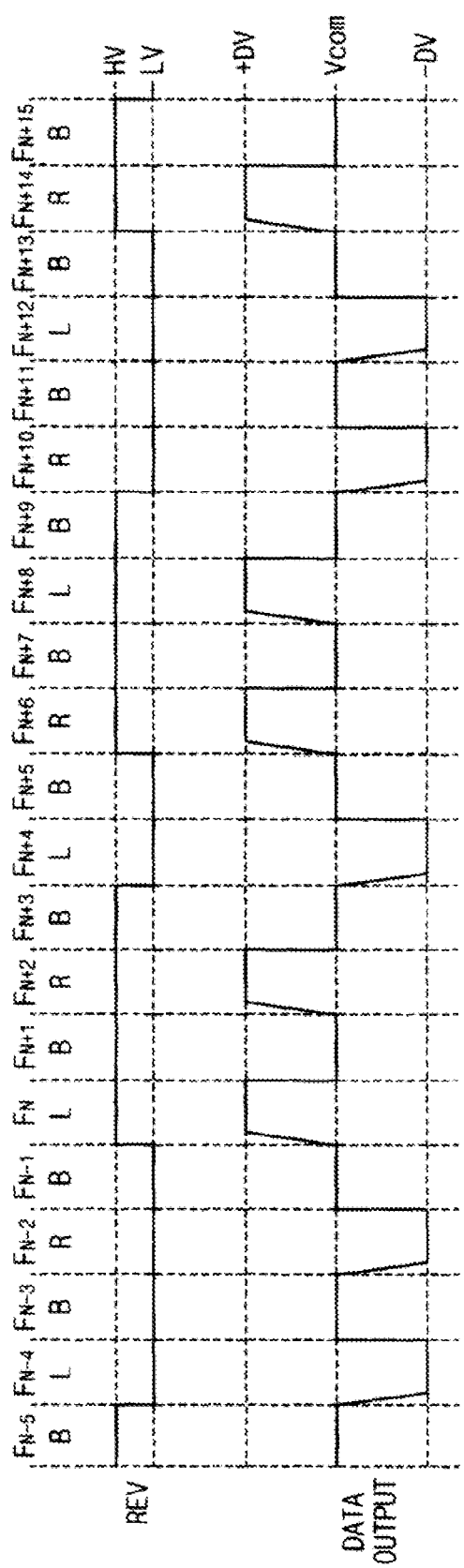
FIG. 10 is a timing diagram of input/output signals in the 3D stereoscopic image mode of the display apparatus of FIG. 8.

FIG. 10 is a timing diagram of input/output signals in the 3D stereoscopic image mode of the display apparatus of FIG. 8.

Referring to FIGS. 8 and 10, in the 3D stereoscopic image mode, the image processing part 200 repeatedly outputs in sequence a left-eye data frame L, a left-eye black data B, a right-eye data frame R, and a right-eye black data frame B.

The data compensating part 430 generates compensating data based on data received from the timing controller 310 using the look-up table 433, and then outputs the compensating data.

The data driving part 510 converts the compensating data received from the data compensating part 430 to an analog data voltage, and outputs the positive or negative polarity data voltage in response to the inversion signal REV received from the timing controller 310.

For example, in a display apparatus having a display panel 100, a 240 Hz frame frequency, and a 60 Hz shutter glass 600, the inversion signal REV has a period of twenty frames. For example, the inversion signal REV is at the low level LV during four frames ($F_{N-4}$, $F_{N-3}$, $F_{N-2}$, $F_{N-1}$), the high level HV during four frames ($F_N$, $F_{N+1}$, $F_{N+2}$, $F_{N+3}$), the low level LV during two frames ($F_{N+4}$, $F_{N+5}$), the high level HV during four frames ($F_{N+6}$, $F_{N+7}$, $F_{N+8}$, $F_{N+9}$), the low level LV during four frames ($F_{N+10}$, $F_{N+11}$, $F_{N+12}$, $F_{N+13}$), and the high level HV during two frames ($F_{N+14}$, $F_{N+15}$). For example, the period of the inversion signal may be (16×K+4) frames, where 'K' is a natural number.

In the same manner, in a display apparatus having a display panel 100, a 480 Hz frame frequency, and a 60 Hz shutter glass 600, the period of the inversion signal may be (32×K+4) frames. Accordingly, in a 480 Hz frame frequency display apparatus, since four left-eye data frames (L, L, L, B) and four right-eye data frames (R, R, R, B) are displayed in the display apparatus, the polarity is reversed in units of eight frames. The inversion signal REV has the period of thirty-six frames. For example, the inversion signal REV is at the low level LV for eight frames, the high level HV for the next eight frames, the low level LV for the next two frames, the high level for the next eight frames, the low level LV for the next eight frames, and the high level HV for the next two frames. Therefore, the period of the inversion signal is (8×4+4) frames.

According to the inversion signal REV, in the data voltage outputted to the data lines DL, the left-eye data voltage (L) has negative polarity −DV during the (N−4)-th frame $F_{N-4}$, the right-eye data voltage (R) has negative polarity −DV during the (N−2)-th frame $F_{N-2}$, the left-eye data voltage (L) has positive polarity +DV during the N-th frame $F_N$, the right-eye data voltage (R) has positive polarity +DV during the (N+2)-th frame $F_{N+2}$, the left-eye data voltage (L) has negative polarity −DV during the (N+4)-th frame $F_{N+4}$, the right-eye data voltage (R) has positive polarity +DV during the (N+6)-th frame $F_{N+6}$, the left-eye data voltage (L) has positive polarity +DV during the (N+8)-th frame $F_{N+8}$, the right-eye data voltage (R) has negative polarity −DV during the (N+10)-th frame $F_{N+10}$, the left-eye data voltage (L) has negative polarity −DV during the (N+12)-th frame $F_{N+12}$, the right-eye data voltage (R) has positive polarity +DV during the (N+14)-th frame $F_{N+14}$.

Considering the left-eye data voltages, the frames having a voltage polarity reversed with respect to the previous frame are the (N−4)-th frame, the N-th frame and the (N+4)-th frame ($F_{N-4}$, $F_N$, $F_{N+4}$), and the frames having a voltage polarity substantially identical to that of the previous frame are the (N+8)-th frame and the (N+12)-th frame ($F_{N+8}$, $F_{N+12}$).

Considering the right-eye data voltages, the frames having a voltage polarity reversed with respect to the previous frame are the (N+6)-th frame, the (N+10)-th frame and the (N+14)-th frame ($F_{N+6}$, $F_{N+10}$, $F_{N+14}$), and the frames having a voltage polarity substantially identical to that of the previous frame are the (N−2)-th frame and the (N+2)-th frame ($F_{N-2}$, $F_{N+2}$).

During a period of the inversion signal REV, the number of left-eye data frames having a voltage polarity reversed with respect to the previous frame is three. The number of left-eye frames having a voltage polarity substantially identical to that of the previous frame is two. The number of right-eye frames having a voltage polarity reversed with respect to the previous frame is three. The number of the right-eye frames having a voltage polarity substantially identical to that of the previous frame is two. Accordingly, the conditions for polarity inversion of the data voltage in the left-eye frames and the right-eye frames are substantially identical.

Therefore, as described in FIGS. 9A and 9B, a voltage difference shared by the charge-down capacitor Cd based on the polarity inversion of the data voltage among the frames is generated, to decrease the luminance difference between the left-eye and right-eye images. Accordingly, since the luminance difference between the left-eye and right-eye images may not be visible to an observer, display quality may be enhanced.

According to a present example embodiment, the left-eye and right-eye data are compensated based on the voltage shared by the charge-down capacitor Cd as a function of the polarity inversion of the data voltage, to enhance the luminance difference between the left-eye and right-eye images. In addition, the inversion signal is used to decrease the luminance difference between the left-eye and right-eye images, to enhance display quality.

The foregoing is illustrative of example embodiments of the present invention and is not to be construed as limiting thereof. Although a few example embodiments of the present invention have been described, those skilled in the art will readily appreciate that many modifications are possible in the example embodiments without materially departing from the novel teachings of the embodiments of the present invention. Therefore, it is to be understood that the foregoing is illustrative of the embodiments of the present invention and is not to be construed as limited to the specific example embodiments disclosed, and that modifications to the disclosed example embodiments, as well as other example embodiments, are intended to be included within the scope of the appended claims. Example embodiments of the present invention are defined by the following claims, with equivalents of the claims to be included therein.

What is claimed is:

1. A method of driving a display panel, the method comprising:
    outputting to a pixel unit of the display panel a left-eye data voltage having a potential with respect to a reference voltage, during a left-eye frame;
    applying the left-eye data voltage to first and second liquid crystal capacitors during an N-th interval of the left-eye frame, wherein N is a natural number, the first and second liquid crystal capacitors being respectively formed in first and second sub regions of the pixel unit;
    applying a first division voltage to the second liquid crystal capacitor during an (N+1)-th interval of the left-eye frame, the first division voltage being divided from the left-eye data voltage by a charge-down capacitor connected to the second liquid crystal capacitor;
    outputting to the pixel unit of the display panel a right-eye data voltage having a potential with respect to the reference voltage different from the potential of the left-eye data voltage during a right-eye frame;
    applying the right-eye data voltage to the first and second liquid crystal capacitors during an N-th interval of the right-eye frame; and
    applying a second division voltage to the second liquid crystal capacitor during an (N+1)-th interval of the right-eye frame, the second division voltage being divided from the right-eye data voltage by the charge-down capacitor connected to the second liquid crystal capacitor,
    wherein a pixel electrode of the first liquid crystal capacitor has a first potential and a pixel electrode of the second liquid crystal capacitor has a second potential less than the first potential during the left-eye frame,
    a pixel electrode of the first liquid crystal capacitor has a third potential less than the first potential, and a pixel electrodes of the second liquid crystal capacitor has a fourth potential less than the third potential and greater than the second potential during the right-eye frame, and
    an average transmittance in the first and second sub regions during the left-eye frame is identical to that during the right-eye frame.

2. The method of claim 1, further comprising:
    outputting to the pixel unit of the display panel a left-eye black data voltage during a left-eye black frame after the left-eye frame; and
    outputting to the pixel unit of the display panel a right-eye black data voltage during a right-eye black frame after the right-eye frame.

3. The method of claim 2, further comprising:
    generating a inversion signal configured to control a polarity of a data voltage,
    wherein the inversion signal has a period of eight frames in which the left-eye frame, the left-eye black frame, the right-eye frame and the right-eye black frame are repeated.

4. The method of claim 3, wherein outputting to the pixel unit the left data voltage or the right data voltage comprises;
    outputting to the pixel unit of the display panel a first data voltage having a first potential with respect to a reference voltage, during a first frame in which a data voltage polarity with respect to the reference voltage is reversed with respect to that of the data voltage in a previous frame; and
    outputting to the pixel unit of the display panel a second data voltage having a third potential with respect to the reference voltage less than the first potential, during a second frame in which the data voltage polarity with respect to the reference voltage is identical to that of a data voltage in the previous frame.

5. The method of claim 4, wherein the left-eye data voltage is outputted to the pixel unit during the first frame and the right-eye data voltage is outputted to the pixel unit during the second frame.

6. A display apparatus comprising:
    a display panel including a pixel unit, the pixel unit comprising a first liquid crystal capacitor formed in a first sub region, and connected to a data line and an N-th gate line through a first switching element, wherein 'N' is a natural number, a second liquid crystal capacitor formed in a second sub region, and connected to the data line and the N-th gate line through a second switching element, and a charge-down capacitor connected to the second liquid crystal capacitor and an (N+1)-th gate line for dividing a voltage applied to the second liquid crystal capacitor through a third switching element;

a data compensating part for generating first compensating data for a left-eye fame and second compensating data for a right-eye frame; and a panel driving part outputting a left-eye data voltage having a potential with respect to a reference voltage to the pixel unit during a left-eye frame and a right-eye data voltage having a potential with respect to the reference voltage different from the potential of the left-eye data voltage to the pixel unit during a right-eye frame, the left-eye data voltage generated based on the first compensating data and the right-eye data voltage generated based on the second compensating data, wherein a pixel electrode of the first liquid crystal capacitor has a first potential and a pixel electrode of the second liquid crystal capacitor has a second potential less than the first potential during the left-eye frame, a pixel electrode of the first liquid crystal capacitor has a third potential less than the first potential, and a pixel electrode of the second liquid crystal capacitor has a fourth potential less than the third potential and greater than the second potential during the right-eye frame, and an average transmittance in the first and second sub regions during the left-eye frame is identical to that during the right-eye frame.

7. The display apparatus of claim 6, wherein the panel driving part outputs to the pixel unit a left-eye black data voltage during a left-eye black frame after the left-eye frame, and outputs to the pixel unit a right-eye black data voltage during a right-eye black frame after the right-eye frame.

8. The display apparatus of claim 7, further comprising:
a timing controller generating a inversion signal configured to control a polarity of a data voltage,
wherein the inversion signal has a period of eight frames in which the left-eye frame, the left-eye black frame, the right-eye frame and the right-eye black frame are repeated.

9. The display apparatus of claim 6, wherein the data compensating part comprises:
a first look-up table for generating the first compensating data; and a second look-up table for generating the second compensating data, wherein the panel driving part outputs to the pixel unit a first data voltage having a first potential with respect to a reference voltage, during a first frame in which the data voltage polarity with respect to the reference voltage is reversed with respect to that of the data voltage in a previous frame, using the first compensating data; and outputs to the pixel unit a second data voltage having a third potential with respect to the reference voltage less than the first potential, during a second frame in which a data voltage polarity with respect to the reference voltage is identical to that of a data voltage in the previous frame, using the second compensating data.

10. The display apparatus of claim 6, wherein the data compensating part comprises:
a look-up table for generating the first compensating data; and a computing part for generating the second compensating data using the first frame compensating data, wherein the panel driving part outputs to the pixel unit a first data voltage having a first potential with respect to a reference voltage, during a first frame in which the data voltage polarity with respect to the reference voltage is reversed with respect to that of the data voltage in a previous frame, using the first compensating data; and outputs to the pixel unit a second data voltage having a second potential with respect to the reference voltage less than the first potential, during a second frame in which a data voltage polarity with respect to the reference voltage is identical to that of a data voltage in the previous frame, using the second compensating data.

11. The display apparatus of claim 9, wherein the panel driving part outputs a left-eye data voltage to the display panel during the first frame, and outputs a right-eye data voltage to the display panel during the second frame.

* * * * *